United States Patent [19]

Gaussens et al.

[11] Patent Number: 4,537,668

[45] Date of Patent: Aug. 27, 1985

[54] PROCESS FOR THE PRODUCTION OF A CATION EXCHANGE DIAPHRAGM AND THE DIAPHRAGM OBTAINED BY THIS PROCESS

[75] Inventors: Gilbert Gaussens, Meudon; Francis Lemaire, Chatillon Sous Bagneux, both of France

[73] Assignee: Commissariat a l'Energie Atomique, Paris, France

[21] Appl. No.: 272,206

[22] Filed: Jun. 10, 1981

[30] Foreign Application Priority Data

Jun. 24, 1980 [FR] France ............................ 80 13939

[51] Int. Cl.$^3$ .............................................. C25B 13/08
[52] U.S. Cl. ................................ 204/159.17; 204/296; 264/25; 264/41; 264/216; 264/331.15; 427/36; 521/27; 521/31; 525/344
[58] Field of Search .................... 204/296, 159.17; 427/36, 244, 245, 246; 264/25, 216, 331.15, 41; 521/27, 31; 525/344

[56] References Cited

U.S. PATENT DOCUMENTS

| | | | |
|---|---|---|---|
| 3,304,272 | 2/1967 | Zenftman et al. | 521/27 |
| 3,905,879 | 9/1975 | Eng et al. | 204/92 |
| 3,928,687 | 12/1975 | Wada et al. | 428/461 |
| 4,012,303 | 3/1977 | D'Agostino et al. | 204/159.17 |
| 4,481,306 | 11/1984 | Marhus et al. | 521/31 |

FOREIGN PATENT DOCUMENTS

| | | |
|---|---|---|
| 2121077 | 8/1972 | France . |
| 2257617 | 8/1975 | France . |
| 1199952 | 7/1970 | United Kingdom . |

*Primary Examiner*—R. L. Andrews
*Attorney, Agent, or Firm*—James E. Nilles

[57] ABSTRACT

Cation exchanger diaphragm which can in particular be used as a solid electrolyte.

This diaphragm comprises a grafted copolymer film, particularly polyethylene grafted by styrene and has an exchange capacity exceeding 0.5 meq/g, a resistivity below 100Ω.cm, a swelling in water exceeding 30% compared with the dry mass and a permeability relative to oxygen and hydrogen such that in the electrolysis of water these two gases are obtained with a purity level exceeding 98%.

19 Claims, No Drawings

PROCESS FOR THE PRODUCTION OF A CATION EXCHANGE DIAPHRAGM AND THE DIAPHRAGM OBTAINED BY THIS PROCESS

BACKGROUND OF THE INVENTION

The present invention relates to a process for the production of a cation exchange diaphragm comprising cation exchanger groups and the diaphragm obtained by this process. It also relates to the use of this diaphragm as a solid electrolyte for the production of hydrogen by the electrolysis of water.

In this application, electrolysis is performed within the diaphragm which is swollen by water and which ensures the sealing between the anodic and cathodic compartments in which are respectively evolved oxygen and hydrogen. In the art, reference is made to solid polymer electrolyte or "S P E" processes.

The anode and the cathode can be formed by the deposition of a conductive layer for electric current on each of the two faces of the diaphragm, the two layers forming the electrodes being connected to the terminals of a power supply.

When a potential difference is applied to the electrodes:

in contact with the anode the water is decomposed as follows:

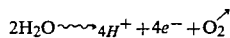

in contact with the cathode the evolution of hydrogen as follows:

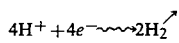

The existing exchange diaphragms of the present type do not simultaneously have a sufficiently high exchange capacity, a sufficiently low electrical resistance, a sufficiently high swelling in water and a permeability to gases, particularly $H_2$ and $O_2$ which is sufficiently low to meet practical requirements. Moreover, their chemical inertia is not always satisfactory.

BRIEF SUMMARY OF THE INVENTION

The invention relates to a process for producing a cation exchange diaphragm leading to diaphragms having the characteristics referred to hereinbefore.

The present invention also relates to a process for the production of a cation exchange diaphragm, wherein in a first stage a grafted copolymer powder is prepared by grafting ethylenically unsaturated monomers onto a polymer powder so as to obtain a grafting degree of the monomers on the polymer of 15 to 60%, in a second stage the grafted copolymer powder is brought into the form of a thin film by dissolving the grafted copolymer powder in an organic solvent, by pouring the thus obtained solution onto a support and then evaporating the solvent and in a third stage the cation exchanger groups are fixed to the thus obtained grafted copolymer film.

In the first stage of the process, the grafted copolymer powder can be prepared by bringing the polymer powder into contact with a solution of the ethylenically unsaturated monomers and by polymerizing these monomers by a free radical formation mechanism.

Preferably, this stage is performed by exposing a suspension of the polymer powder in a solution of the monomers to irradiation by means of ionizing rays. The ionizing rays which can be used are ultraviolet rays, X-rays, $\alpha$, $\beta$ or $\gamma$ rays and accelerated electron beams.

For performing this first stage, it is advantageous to use a polymer powder having a grain size below 100 $\mu$m, preferably between 5 and 50 $\mu$m and more particularly between 10 and 20 $\mu$m.

According to an advantageous embodiment of the process of the invention, the polymer powder is a polyethylene powder and the monomers are chosen from the group consisting of styrene and/or one or more of its derivatives such as $\alpha$-methylstyrene, $\alpha$-bromostyrene, $\alpha$-chlorostyrene, chloromethylstyrene, bromomethylstyrene and divinylbenzene.

In this case, it is advantageous to carrying out grafting under ionizing radiation using an irradiation dose of 1000 to 5000 Gy.

In the second stage of the process according to the invention, the thin grafted copolymer film can be reinforced by incorporating a woven fabric into the thin film, e.g. by pouring the solution onto a support on which is arranged a reinforcing fabric or by hot pressing the thin film against a reinforcing fabric. This makes it possible to improve the mechanical properties of the diaphragm obtained.

In the third stage of the process according to the invention advantageously —$HSO_3$ cation exchanger groups are fixed to the grafted copolymer film obtained by immersing the latter in a chlorosulphonic acid bath, a concentrated sulphuric acid bath or a fuming sulphuric acid bath.

The invention also relates to a cation exchange diaphragm obtained by the above process. This cation exchange diaphragm comprises a grafted copolymer film on which are fixed cation exchanger groups, wherein its exchange capacity exceeds 0.5 milliequivalents per gram (meq/g) and is preferably above 1.75 meq/g, its resistivity is below 100$\Omega$.cm, preferably below 70$\Omega$.cm and its swelling in water exceeds 30% and preferably exceeds 60% compared with the dry mass.

It is pointed out that the exchange capacity of the diaphragm corresponds to the number of cation exchanger groups per unit of weight of the grafted copolymer film.

According to the invention, the diaphragm preferably has an exchange capacity between 1.75 and 4 meq/g, a resistivity between 70 and 20$\Omega$.cm and swelling in water between 60 and 100% compared with the dry mass.

Advantageously, its thickness is between 30 and 150 $\mu$m.

According to the invention, the film is preferably formed from a grafted copolymer comprising 30 to 37.5% by weight of units of one or more monomers chosen from the group containing styrene and one of its derivatives such as $\alpha$-methylstyrene, $\alpha$-bromostyrene, $\alpha$-chlorostyrene, chloromethylstyrene, bromomethylstyrene and divinylbenzene and 62.5 to 87% by weight of a polymer such as polyethylene, polypropylene, polybutadiene or another polyolefin.

Preferably, according to the invention, the grafted copolymer is polyethylene grafted by styrene and/or one or more of its derivatives, the copolymer containing 13 to 37.5% by weight of units coming from the styrene and/or its derivatives.

As a result of the use of the aforementioned copolymers, the diaphragm according to the invention has a good chemical inertia, so that in particular it can resist the action of oxygen, hydrogen and electrolyte solutions, as well as strong acids such as are conventionally used for rinsing modules of cells for producing hydrogen by the electrolysis of water.

Therefore, it can advantageously be used as a solid electrolyte for producing hydrogen having a purity in excess of 98% by electrolysis of water.

DETAILED DESCRIPTION OF THE PREFERRED EMBODIMENTS

Other features of the invention will be gathered from reading the following description of embodiments and examples given in an illustrative and non-limitative manner.

The following or an equivalent procedure is used for producing a cation exchange diaphragm according to the invention.

A solution of monomers, for example styrene or one or more of its derivatives is prepared in an alcoholic solvent such as ethanol and methanol. The content of the solution in styrene and/or its derivatives is advantageously 5 to 30% by weight. In said solution is suspended a fine polymer powder, e.g. high or low density polyethylene. The grain size of the powder is below 100 $\mu$m, preferably between 5 and 50 $\mu$m and more particularly between 10 and 20 $\mu$m. This polyethylene powder is commercially available and is prepared by per se known processes. The quantity of polyethylene powder per unit of volume of the solution is 5 to 30%.

At ambient temperature and particularly at between 18° and 23° C., the suspension is placed in a hermetic container connected to a vacuum source. Advantageously, a vacuum of $10^{-2}$ to $10^{-3}$ Torr. is produced.

Whilst maintaining the above temperature, the polyethylene suspension in the styrene solution is exposed to an adequate gamma radiation to bring about a degree of grafting of the styrene on the polyethylene of 15 to 60%.

In practice, irradiation is carried out by means of a cobalt 60$\gamma$ source and it is ensured that the irradiation dose is between 1000 and 5000 Gy. The irradiation time is between 30 minutes and 4 hours.

Once the irradiation is at an end with the desired grafting degree, the grafted copolymer suspension is removed from the enclosure. This is followed by decanting, washing with ethanol until residual traces of monomer have been removed and drying until a constant weight is obtained in the oven at 60° C. The weight increase of the polyethylene powder represents the degree of grafting.

Whilst still at ambient temperature, the grafted copolymer powder is dissolved in a solvent chosen from perhydronaphthalene or its derivatives, xylenes and chloronaphthalenes, dissolving being carried out at a rate of 20 to 150 g of powder per liter of solvent.

In this way, an optimum uniform dispersion of the copolymer is achieved and is then brought into the form of a film. For this purpose, the solution is poured onto a flat, non-adhesive support, e.g. polytetrafluoroethylene or polyvinylidene fluoride in such a way that a liquid layer is obtained. The thickness of this layer is a function of the desired film thickness, which is itself a function of the degree of grafting. The solvent is evaporated by raising the temperature of the solution to approximately 70° to 100° C. Generally, the thickness of the finished film constituting the diaphragm is 30 to 150 $\mu$m.

It is advantageous to reinforce the mechanical properties of the film by incorporating a fabric portion, particularly a woven fabric portion constituted, for example, by multifilaments of glass fibres or monofibres of polypropylene. Such commercially available fabrics can be manufactured according to per se known processes.

For incorporating the fabric portion in the film mass, it is possible to pour the grafted copolymer solution onto the fabric placed on the support. It is also possible to hot press the film formed against the fabric. In the latter case, the pressure exerted is generally 0.1 to 20 kg/cm$^2$ and the temperature 100° to 160° C.

The subsequent immersion in pure chlorosulphonic acid of the aforementioned films for the purpose of fixing the —HSO$_3$ exchanger groups takes place at ambient temperature for a time between 30 and 120 minutes, which is chosen as a function of the grafting degree and the thickness of the film.

This is followed by the washing of the film using e.g. acetic acid. Washing is continued until all the residual chlorosulphonic acid is eliminated. This is in turn followed by rinsing with soft water until the washing water is at pH 7.

The sulphonation treatment efficiency is 90 to 100%.

The use of the basic polymer in the form of ultrafine powder makes it possible to obtain an excellent grafting homogeneity in the copolymer formed. The dissolving of the grafted copolymer powder makes it possible to obtain an excellent uniformity of distribution of the polystyrene grafts in the copolymer mass.

The result of this excellent homogeneity of the copolymer is a very low resistivity on the final cation exchange diaphragm because the electric power consumption due to the Joule effect in the diaphragm during electrolysis of the water is very low.

The diaphragm exchange capacity according to the invention, i.e. the number of exchangeable groups per unit of weight or volume, which is a function of the degree of grafting, exceeds 0.5 meq/g and is preferably between 1.75 and 4 meq/g giving the diaphragm an excellent conductivity.

The resistivity of the diaphragm is low, being below 100 and preferably between 70 and 20$\Omega$.cm. As a result, there is only a low electric power consumption by the Joule effect in the diaphragm. Therefore, the temperature rise in the diaphragm is low, which increases its life.

There is a high swelling in water on the part of the diaphragm. This is between 30 and 100% compared with the dry mass of the diaphragm permitting a good turnover of the water consumed by electrolysis within the diaphragm, the swelling preferably between 60 and 100%.

It has a low permeability to gases and more particularly hydrogen and oxygen. As a result, high purity gases purer than 98 to 99% can be obtained during electrolysis. The diaphragm ensures the sealing between the compartment in which the hydrogen is formed and that in which the oxygen is formed.

Finally, the film constituting the diaphragm according to the invention has a good chemical inertia and excellent mechanical properties when it is reinforced by a fabric portion. As a result, it can be used in the production of H$_2$ by the electrolysis of water in the case of a high pressure difference between the two compartments of the electrolysis module.

The following examples relates to advantageous embodiments of the invention.

EXAMPLE 1

A quantity of 150 g of powder of grain size between 10 and 20 μm of low density polyethylene suspended in 750 ml of a solution containing by volume 20% of styrene and 80% of ethanol is exposed under vacuum and at ambient temperature to cobalt 60γ radiation. The dose supplied is 3000 Gy. After washing with ethanol and drying to constant weight, the measured grafting degree is 40%.

The copolymer formed is dissolved at ambient temperature in perhydronaphthalene with a concentration of 80 g/l, then poured onto a plate preheated to 80° C. and coated with polytetrafluoroethylene. Pouring takes place in two successive applications and after total evaporation of the solvent, the thus obtained film having a thickness of 100 μm.

The copolymer film is then immersed for 70 minutes at ambient temperature in pure chlorosulphonic acid. It is then rinsed twice with acetic acid and twice with water. The second rinsing operation takes place in a continuous water circulation until a neutral pH of the rinsing solution is obtained. The measured sulphonation efficiency is 95%.

The thus produced diaphragm has an exchange capacity of 3.1 meq/g, a resistivity of 46Ω.cm, a water content of 85% and a low permeability to oxygen and hydrogen.

During utilization in an electrolysis module, using platinum electrodes and a current of 2000 $A/m^2$, the gases produced contain less than 0.5% impurities. After 1500 hours of use, there is no deterioration of its operation.

EXAMPLE 2

The method for obtaining the grafted copolymer is as described in example 1. The irradiation dose supplied is 1800 Gy, so that the measured grafting degree is then 24%.

The film formation and sulphonation procedures (treatment by chlorosulphonic acid) are identical to those described in example 1.

The film obtained has a thickness of 100 μm and the sulphonation efficiency is 93%.

The thus produced diaphragm has an exchange capacity of 1.85 meq/g, a resistivity of 64Ω.cm, a water content of 66% and a low permeability to oxygen and hydrogen.

EXAMPLE 3

The preparation of the grafted copolymer and the procedure for forming the film are as described in example 1.

The copolymer film (grafting degree 40%) with a thickness of 100 μm produced in this way is then hot pressed onto a woven fabric of continuous glass fibre multifilaments under a pressure of 5 $kg/cm^2$ and a temperature of 125° C.

This reinforced film is then sulphonated by chlorosulphonic acid in accordance with the procedure described in example 1. The sulphonation time is 90 minutes and the measured sulphonation efficiency 94%.

The thus produced diaphragm has mechanical properties considerably improved compared with those of the diaphragms of examples 1 and 2. Its exchange capacity is 3.2 meq/g, its resistivity 56Ω.cm, its water content 98% and it also has a low permeability to hydrogen and oxygen.

When used in an electrolysis module, with platinum electrodes and under a current of 2000 $A/m^2$, the gases produced contain less than 1.5% impurities.

EXAMPLE 4

The preparation of the grafted copolymer is the same as that described in example 1, the grafting degree being 40%.

The film is produced by pouring three times in succession an 80 g/l copolymer solution in perhydronaphthalene onto a woven glass fibre fabric identical to that described in example 3. Dissolving, pouring and drying are the same as described in example 1.

The chlorosulphonic acid treatment is the same as described in example 1. The reaction time being 105 minutes, the measured sulphonation efficiency is 96%.

The thus produced diaphragm has considerably improved mechanical properties compared with that of example 1. Its exchange capacity is 3.3 meq/g, its resistivity 49Ω.cm and its water content 92%.

EXAMPLE 5

The grafted copolymer is prepared in the manner described in example 1, the grafting degree being 40%.

The copolymer formed is dissolved at ambient temperature in perhydronaphthalene with a concentration of 120 g/l. It is then poured onto a polyvinylidene fluoride-coated sheet preheated to 85° C. Pouring takes place in two successive applications and, following total evaporation of the solvent, the thus formed film has a thickness of 120 μm. This film is then hot pressed onto a woven polypropylene monofibre fabric at a pressure of 5 $kg/cm^2$ and at a temperature of 123° C.

This reinforced film is then sulphonated with chlorosulphonic acid in accordance with the procedure described in example 1. The reaction time is 90 minutes and the sulphonation efficiency 95%.

Thus thus produced diaphragm has much improved mechanical properties compared with that of example 1. Its exchange capacity is 3.1 meq/g, its resistivity 41Ω.cm, its water content 89% and it has a low permeability to gases and particularly hydrogen and oxygen.

When used in an electrolysis module, with platinum electrodes and under a current of 2000 $A/m^2$, the gases produced contain less than 1% impurities. After 1500 hours of use, there is no degeneration of its function.

EXAMPLE 6

The grafted copolymer is prepared in the manner described in example 1, the grafting degree being 40%.

The film formation procedure is as described in example 1. The copolymer solution concentration is 60 g/l, so that the film produced has a thickness of 70 μm.

A woven polypropylene monofibre fabric is pressed between two 70 μm films under a pressure of 7 $kg/cm^2$ and at a temperature of 126° C. This reinforced film is treated with chlorosulphonic acid as described in example 1. As the reaction time is 90 minutes, the measured sulphonation efficiency is then 97%.

The thus produced diaphragm has much better mechanical properties than the diaphragm of example 1. Its exchange capacity is 3.4 meq/g, its resistivity 28Ω.cm, it s water content 96% and it has a low permeability to hydrogen and oxygen.

When used in an electrolysis module, with platinum electrodes and under a current of 2000 $A/m^2$, the gases produced contain less than 0.5% impurities. After 3500 hours of use, there is no deterioration of its function.

It is obvious that the invention is in no way limited to the embodiments described, which have only been given in an illustrative manner and in fact covers all variants thereof.

What is claimed is:

1. A process for the production of a cation exchange diaphragm, wherein in a first stage of grafted copolymer powder is prepared by grafting styrene and/or its derivatives onto a polyethylene powder by exposing a suspension of said polyethylene and styrene and/or its derivatives to irradiation by means of ionizing rays so as to obtain a grafting degree of the monomers on the polyethylene polymer of 15 to 60%, in a second stage the grafted copolymer powder is brought into the form of a thin film by dissolving the grafted copolymer powder in an organic solvent, by pouring the thus obtained solution onto a support and then evaporating the solvent and in a third stage cation exchanger groups are fixed to the thus obtained grafted copolymer film.

2. A process according to claim 1, wherein the grain size of the polyethylene powder used in the first stage is below 100 μm and is preferably between 5 and 50 μm.

3. A process according to claim 1, wherein the polyethylene powder used in the first stage has a grain size between 10 and 20 μm.

4. A process according to claim 1, wherein the styrene and/or its derivatives are grafted onto the polyethylene under ionizing radiation, the irradiation dose being 1000 to 5000 Gy.

5. A process according to claim 4, wherein in the second stage the grafted polyethylene powder is dissolved in a solvent constituted by perhydronaphthalene, xylene or a chloronaphthalene.

6. A cation exchange diaphragm obtained by the process of claim 1, wherein it comprises a grafted copolymer film on which are fixed cation exchanger groups, wherein its exchange capacity exceeds 0.5 milliequivalents per gram (meq/g) and is preferably above 1.75 meq/g, its resistivity is below 100Ω.cm, preferably below 70Ω.cm and its swelling in water exceeds 30% and preferably exceeds 60% compared with the dry mass.

7. A diaphragm according to claim 6, wherein its exchange capacity is between 1.75 and 4 meq/g, its resistivity is between 70 and 20Ω.cm and its swelling in water is between 60 and 100% relative to the dry mass.

8. A diaphragm according to claims 6 or 7, wherein its thickness is between 30 and 150 μm.

9. A diaphragm according to claim 6, wherein the grafted copolymer comprises 13 to 37.5% by weight of units from one or more monomers chosen from the group containing styrene, α-methylstyrene, α-bromostyrene, α-chlorostyrene, chloromethylstyrene, bromomethylstyrene and divinylbenzene at 62.5 to 87% by weight of polyethylene.

10. A cation exchange diaphragm having an exchange capacity exceeding 0.5 milliequivalents per gram (meq/g) and preferably 1.75 meq/g, a resistivity below 100 Ω.cm, preferably below 70Ω.cm and a swelling in water exceeding 30% and preferably exceeding 60% compared with the dry mass, obtained by a process comprising:

(a) preparing a grafted copolymer powder by exposing a suspension of a polyethylene powder in a solution of ethylenically unsaturated monomers consisting of styrene and/or one or more of its derivatives to irradiation by means of ionizing rays so as to obtain a grafting degree of the monomers on the polymer of 15 to 60%, (b) bringing into the form of a thin film the grafted copolymer powder by dissolving the grafted copolymer powder in an organic solvent, by pouring the thus obtained solution onto a support and then evaporating the solvent, and (c) fixing cation exchanger groups to the thus obtained grafted copolymer film.

11. A cation exchange diaphragm according to claim 10, wherein the grain size of the polymer powder used in stage (a) is below 100 μm and is preferably between 5 and 50 μm.

12. A cation exchange diaphragm according to claim 10, wherein the polymer powder used in stage (a) has a grain size between 10 and 20 μm.

13. A cation exchange diaphragm according to claim 10, wherein the grafted copolymer film is reinforced in stage (b) by incorporating into it a fabric portion.

14. A cation exchange diaphragm according to claim 10, wherein the styrene and/or its derivatives are grafted onto the polyethylene under ionizing radiation, the irradiation dose being 1000 to 5000 Gy.

15. A cation exchange diaphragm according to claim 10, wherein in stage (b) the grafted polyethylene powder is dissolved in a solvent constituted by perhydronaphthalene, xylene or a chloronaphthalene.

16. A cation exchange diaphragm according to claim 10, wherein in stage (c) —HSO₃ cation exchanger groups are fixed to the grafted copolymer film by immersing the latter in a chlorosulphonic, concentrated sulphuric or fuming sulphuric acid bath.

17. A diaphragm according to claim 10, having an exchange capacity between 1.75 and 4 meq/g, a resistivity between 70 and 20Ω.cm and a swelling in water between 60 and 100% relative to the dry mass.

18. A diaphragm according to claim 10 having a thickness between 30 and 150 μm.

19. A diaphragm according to claim 10, wherein the grafted copolymer comprises 13 to 37.5% by weight of units from one or more monomers chosen from the group containing styrene, α-methylstyrene, α-bromostyrene, α-chlorostyrene, chloromethylstyrene, bromomethylstyrene and divinylbenzene at 62.5 to 87% by weight of polyethylene.

* * * * *